US009934167B2

(12) United States Patent
Roos et al.

(10) Patent No.: US 9,934,167 B2
(45) Date of Patent: Apr. 3, 2018

(54) METHOD AND CONTROL DEVICE FOR COMMISSIONING A SENSOR SERIES CIRCUIT CONFIGURED IN A DAISY CHAIN TOPOLOGY, SENSOR SERIES CIRCUIT IN A DAISY CHAIN TOPOLOGY, AND RESTRAINT MEANS

(71) Applicant: Robert Bosch GmbH, Stuttgart (DE)

(72) Inventors: Bernd Roos, Flein (DE); Guenter Weiss, Walheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/337,960

(22) Filed: Oct. 28, 2016

(65) Prior Publication Data

US 2017/0131709 A1 May 11, 2017

(30) Foreign Application Priority Data

Nov. 11, 2015 (DE) .................... 10 2015 222 248

(51) Int. Cl.
*G06F 13/00* (2006.01)
*G06F 7/00* (2006.01)
*G05B 23/02* (2006.01)

(52) U.S. Cl.
CPC ......... *G06F 13/00* (2013.01); *G05B 23/0218* (2013.01); *G05B 23/0275* (2013.01); *G06F 7/00* (2013.01)

(58) Field of Classification Search
CPC ............... H02J 7/0068; Y02T 10/7055; G05B 23/0275; G05B 23/0218
See application file for complete search history.

(56) References Cited

U.S. PATENT DOCUMENTS

| | | | |
|---|---|---|---|
| 2004/0078097 A1* | 4/2004 | Bruzy ................. | G05B 19/042 700/48 |
| 2007/0198139 A1* | 8/2007 | Boran ................ | G05B 19/0423 701/1 |
| 2007/0204082 A1* | 8/2007 | Shimizu ............... | H04L 12/403 710/110 |
| 2012/0136541 A1* | 5/2012 | Inamoto ............. | B60R 21/0173 701/45 |

\* cited by examiner

*Primary Examiner* — Ajay Ojha
(74) *Attorney, Agent, or Firm* — Norton Rose Fulbright US LLP; Gerard Messina

(57) ABSTRACT

A method for commissioning a sensor series circuit configured in a daisy chain topology. A second sensor being downstream from a first sensor. The method includes furnishing a first switch signal to the first sensor to close the first switch, the first switch signal being furnished in response to a successful initialization of the first sensor, monitoring a function of the second sensor during initialization of the second sensor to ascertain whether the second sensor exhibits a fault upon initialization or is initialized correctly, and to furnish a fault signal if it is ascertained that the second sensor exhibits a fault upon initialization; and outputting a suppression signal to the first sensor if the fault signal has been furnished, to prevent the first switch from being closed.

13 Claims, 4 Drawing Sheets

METHOD AND CONTROL DEVICE FOR COMMISSIONING A SENSOR SERIES CIRCUIT CONFIGURED IN A DAISY CHAIN TOPOLOGY, SENSOR SERIES CIRCUIT IN A DAISY CHAIN TOPOLOGY, AND RESTRAINT MEANS

CROSS REFERENCE

The present application claims the benefit under 35 U.S.C. §119 of German Patent Application No. DE 102015222248.9 filed on Nov. 11, 2015, which is expressly incorporated herein by reference in its entirety.

BACKGROUND INFORMATION

In the context of activation of peripheral sensors in a daisy chain topology, all the sensors contain a switch that is closed as soon as the sensor itself has been correctly initialized. Once the switch is closed, the next sensor in the chain is supplied with power and can likewise be initialized. Sensors connected in the daisy chain topology are utilized, for example, to control restraint devices in vehicles, for example airbags.

SUMMARY

In light of the above, example embodiments of the present invention include a method for commissioning a sensor series circuit configured in a daisy chain topology, also a sensor series circuit in a daisy chain topology, and a restraint device; furthermore a control device that uses the method; and lastly a corresponding computer program. Advantageous refinements of and improvements to the apparatus are described herein.

If a sensor daisy chain contains a sensor whose switch is, incorrectly, permanently closed and which is thus defective, according to the approach presented here that defective sensor is detected and is decoupled from a power supply to the daisy chain circuit, by the fact that in a sensor upstream from the defective sensor, a switch for supplying power to the defective sensor remains open.

The sensors upstream from the defective sensor in the daisy chain can thus advantageously be initialized and used. The daisy chain circuit thus does not need to be completely shut off because of the defective sensor, but instead can be operated with maximum possible availability using the correctly operating sensors, the data of which can thus be used in an application coupled to the daisy chain.

A method for commissioning a sensor series circuit configured in a daisy chain topology is presented, the sensor series circuit having at least a first sensor having a first switch and a second sensor having a second switch, the second sensor being downstream from the first sensor in a direction of a current flow through the sensor series circuit, and a closure of the first switch producing a supply of an electrical voltage to the second sensor in order to initialize the second sensor, and the method having the following steps:

furnishing a first switch signal to the first sensor in order to close the first switch, the first switch signal being furnished in response to a successful initialization of the first sensor;

monitoring a function of the second sensor during initialization of the second sensor in order to ascertain whether the second sensor exhibits a fault upon initialization or is initialized correctly, and in order to furnish a fault signal if it is ascertained that the second sensor exhibits a malfunction upon initialization;

outputting a suppression signal to the first sensor if the fault signal has been furnished, in order to prevent the first switch from being closed.

The "daisy chain topology" is to be understood as a series circuit of the sensors in which the sensors are connected one behind another in the manner of links of a chain. A voltage input of a first sensor of the chain can be connected to a voltage output of a voltage source of a control device associated with the daisy chain circuit for providing electrical voltage to the sensors. In the context of the sensors located therebetween a respective sensor can create, by closure of its switch, the voltage supply to the sensor downstream from it.

The switches of the sensors can each be switchable between an open position and a closed position; in the open position of a switch, a sensor downstream from the sensor is not supplied with electrical voltage; and in a closed position of the switch, the sensor downstream from the sensor is supplied with electrical voltage.

The first switch signal, the fault signal, and the suppression signal can each be electrical signals.

"Initialization" of a sensor can be understood as a procedure in which firstly the sensor is switched on by being supplied with electrical voltage, and then a reference measurement or calibration takes place using data of the sensor. The sensors of a daisy chain circuit can be initialized sequentially by allocation of a time slot.

A fault or malfunction upon initialization can exist in the form of a permanently closed switch (called a "switch short circuit") of the relevant sensor. The fault signal can be furnished, for example, to the control device, which can then furnish the suppression signal to the first sensor.

This method can be implemented, for example, in software or hardware or in a mixed form of software and hardware, for example in a control device.

According to an embodiment, the sensor series circuit can have at least a third sensor having a third switch. The third sensor can be downstream from the second sensor in the direction of the current flow through the sensor series circuit. A step of closing the second switch can be provided in order to supply the third sensor with electrical voltage, so as to initialize the third sensor. With the expansion of the sensor circuit to include at least the third sensor, thanks to additional measured data the sensor circuit can be configured to perform its function in even more detailed and robust fashion.

According to a particular embodiment of the sensor series circuit, it can be ascertained in the monitoring step that the second sensor exhibits a malfunction upon initialization if a quiescent current intensity in at least a portion of the sensor series circuit exceeds, in response to the closure of the first switch, a predefined quiescent current intensity threshold value. The fault upon initialization can thereby be identified quickly and inexpensively.

In particular, it can be ascertained in the monitoring step that the second sensor exhibits a malfunction upon initialization if a quiescent current intensity in at least the portion of the sensor series circuit is, in response to the closure of the first switch, twice as great as a reference magnitude of the quiescent current intensity. This embodiment represents a possibility for particularly unequivocal fault detection.

Alternatively or additionally, it can be ascertained in the monitoring step that the second sensor exhibits a malfunction upon initialization if a magnitude of a bus capacitance in at least a portion of the sensor series circuit exceeds, in response to the closure of the first switch, a predefined capacitance threshold value. In this manner as well, fault detection can be implemented quickly and inexpensively.

For example, it can be ascertained in the monitoring step that the second sensor exhibits a malfunction upon initialization if a magnitude of a bus capacitance in at least the portion of the sensor series circuit is, in response to the closure of the first switch, twice as great as a reference magnitude of the bus capacitance. In this manner as well, fault detection can be implemented with an unequivocal result and thus particularly reliably.

It is also favorable if it is ascertained in the monitoring step that the second sensor exhibits a malfunction upon initialization if a rate of a Manchester error in at least a portion of the sensor series circuit exceeds, in response to the closure of the first switch, a predetermined Manchester error rate threshold value. The existence of a malfunction, and the time of occurrence of the malfunction, in the corresponding sensor can thereby already be detected inexpensively and quickly in an evaluation unit in the control device.

For example, the initialization fault can be detected when the Manchester error rate rises by more than 50% with respect to a reference value.

According to a further embodiment the method can have a step of re-initializing the first sensor. The re-initialization step can be executed, in response to the determination that the second sensor exhibits a malfunction upon initialization, before the step of outputting the suppression signal to the first sensor. It is thus possible to ensure without difficulty that the sensor series circuit having the first sensor can be commissioned.

The approach presented here furthermore creates a control device that is configured to carry out, apply control to, or implement, in corresponding devices, the steps of a variant of a method presented here. This variant embodiment of the present invention in the form of a control device also allows the object on which the present invention is based to be achieved quickly and efficiently.

The control device can have for this purpose at least one calculation unit for processing signals or data, at least one memory unit for storing signals or data, at least one interface to a sensor or to an actuator for reading in sensor signals from the sensor or for outputting control signals to the actuator, and/or at least one communication interface for reading in or outputting data that are embedded in a communication protocol. The calculation unit can be, for example, a signal processor, a microcontroller, or the like, and the memory unit can be a flash memory, an EPROM, or a magnetic memory unit. The communication interface can be configured to read in or output data wirelessly and/or in wire-based fashion; a communication interface that can read in or output wired-based data can, for example electrically or optically, read in those data from a corresponding data transfer line or output them into a corresponding data transfer line.

A "control device" can be understood in the present instance as an electrical device that processes sensor signals and outputs control signals and/or data signals as a function thereof. The control device can have an interface that can be embodied in hardware- and/or software-based fashion. With a hardware-based embodiment the interfaces can be, for example, part of a so-called "system ASIC" that contains a wide variety of functions of the control device. It is also possible, however, for the interfaces to be separate integrated circuits or to be made up at least in part of discrete constituents. With a software-based embodiment the interfaces can be software modules that are present, for example, on a microcontroller in addition to other software modules.

In an advantageous embodiment, control of a variant of the above-described method for commissioning a sensor series circuit configured in a daisy chain topology is effected by the control device. The control device can access for that purpose, for example, sensor signals such as a switch signal, a fault signal, and a suppression signal.

Also presented is a sensor series circuit that is configured in a daisy chain topology, the sensor series circuit having the following features:

at least a first sensor having a first switch and a second sensor having a second switch, the second sensor being downstream from the first sensor in a direction of a current flow through the sensor series circuit; and a control device as described above that is electrically conductively connected or connectable to the first sensor.

The sensor series circuit can be configured to capture data and furnish them to the control device. In an operating mode of the sensor series circuit, for example, the first sensor can be supplied with electrical voltage and can be in use, and the second sensor can be decoupled from the electrical voltage and can be inactive.

Also presented is a restraint device having a control device and a sensor series circuit as described above.

The restraint device can be configured to be electrically conductively connected to the control device. The restraint device can be an apparatus for protecting occupants of a vehicle in the event of a collision. The restraint device can be installed for that purpose in a vehicle. The restraint device can be, for example, a vehicle airbag.

According to an embodiment of the restraint device, the control device can be configured to trigger the restraint device in response to a triggering signal. The triggering signal can be generated in a device of the control device using data of the sensor series circuit, and can be furnished to an interface of the control device having the restraint device.

Also advantageous is a computer program product or computer program having program code that can be stored on a machine-readable medium or memory medium such as a semiconductor memory, a hard drive memory, or an optical memory, and can be used to carry out, implement, and/or apply control to the steps of the method in accordance with one of the embodiments described above, in particular when the program product or program is executed on a computer or an apparatus.

Exemplifying embodiments of the present invention are depicted in the figures and explained in further detail in the description below.

DETAILED DESCRIPTION OF EXAMPLE EMBODIMENTS

Figure 1:
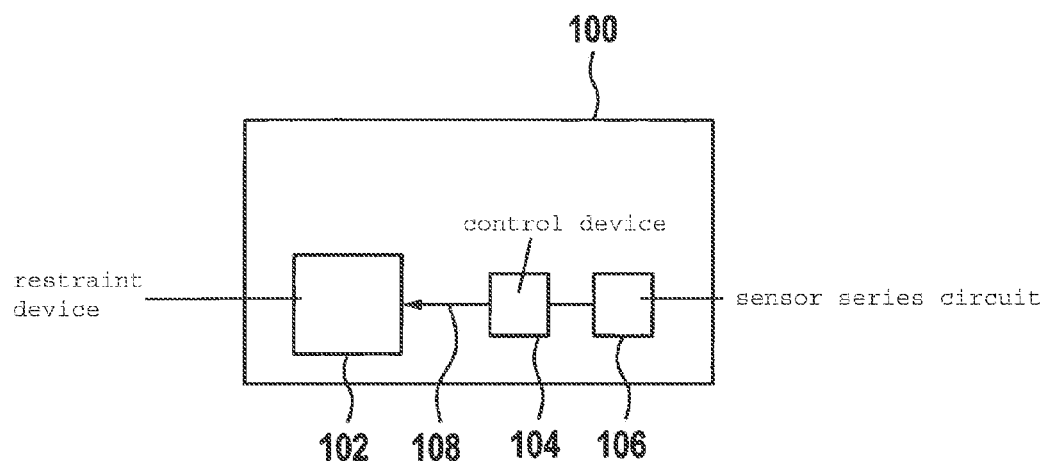
FIG. 1 schematically depicts a vehicle having a restraint device according to an exemplifying embodiment.

In the description below of favorable exemplifying embodiments of the present invention, identical or similar reference characters are used for the elements that are depicted in the various Figures and that function similarly, those elements not being described repeatedly.

FIG. 1 schematically depicts an exemplifying vehicle 100. Vehicle 100 is a road vehicle such as a passenger car or truck. Vehicle 100 has a restraint device 102 that is coupled to a control device 104. Restraint device 102 is configured to restrain a vehicle occupant in the vehicle seat in the event of a collision of vehicle 100 in order to protect the occupant from collision-related injuries. In the exemplifying embodiment shown in FIG. 1 restraint device 102 is an airbag 102, for example a front airbag 102, of vehicle 100. Control device 104 is electrically conductively connected to a sensor series circuit 106. Sensors of sensor series circuit 106 are interconnected in a daisy chain topology.

The purpose of the sensors is to detect a collision of vehicle 100 and to furnish corresponding data to control device 104. Control device 104 is configured to furnish to restraint device 102 via a suitable interface, using the data, a triggering signal 108 in order to trigger restraint device 102.

Figure 2:
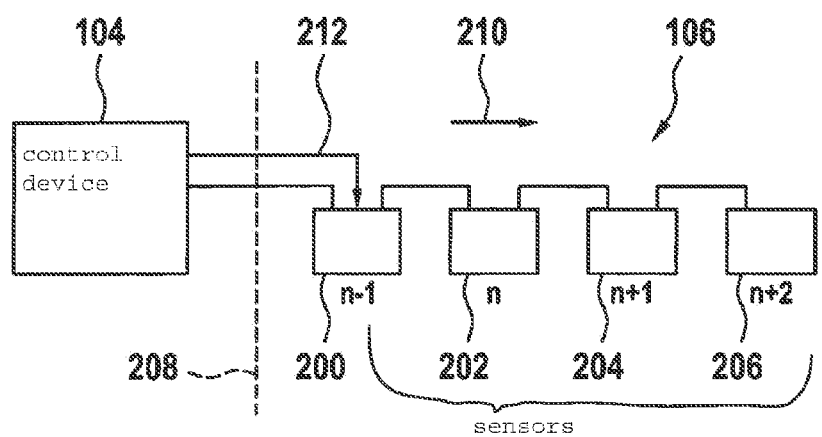
FIG. 2 schematically depicts a control device in combination with a sensor series circuit configured in a daisy chain topology, according to an exemplifying embodiment.

FIG. 2 schematically depicts an exemplifying embodiment of control device 104 in combination with an exemplifying embodiment of sensor series circuit 106 configured in a daisy chain topology. Control device 104 is also referred to hereinafter as electronic control unit (ECU) 104. Sensor series circuit 106 is present here in the form of a PSI5 circuit 106. A "PSI5 circuit" can be understood in the present case as a circuit in which sensors are attached via a two-wire lead. A PSI5 circuit of this kind is used in particular in the field of automotive engineering. Sensor series circuit 106 encompasses a first sensor 200 having an ordinal number n−1, a second sensor 202 having an ordinal number n, a third sensor 204 having an ordinal number n+1, and a fourth sensor 206 having an ordinal number n+2. Sensors 200, 202, 204, 206 are interconnected in a daisy chain topology.

First sensor 200 is connected via an interface 208 to control device 104. Second sensor 202 is connected to first sensor 200, third sensor 204 is connected to second sensor 202, and fourth sensor 206 is connected to third sensor 204. A series circuit is thus formed, the first member of which is constituted by control unit 104 and the last member of which is constituted by fourth sensor 206.

In a direction of a current flow 210, labeled with an arrow in the depiction in FIG. 2, in sensor series circuit 106, second sensor 202 is downstream from first sensor 200, third sensor 204 is downstream from second sensor 202, and fourth sensor 206 is downstream from third sensor 204.

All the sensors 200, 202, 204, 206 are equipped with a switch called a "daisy chain switch." If a switch is open, a current flow from the sensor associated with the switch to the next sensor connected after the sensor in current flow direction 208 is interrupted. If the switch is closed, electric current can flow between the sensors.

In a daisy chain sensor circuit as shown by way of example in FIG. 2, the sensors are initialized sequentially by allocation of a time slot. After successful initialization of a sensor, a switch in the sensor is closed in order to supply the next sensor with electrical voltage so as to initialize it. If all the sensors are operating correctly, they are thereby sequentially initialized. The entire circuit is then commissioned.

In sensor series circuit 106 shown by way of example in FIG. 2, the daisy chain switch of second sensor 202 having the ordinal number n, for supplying power to the subsequent third sensor 204 having the ordinal number n+1 in the daisy chain, is permanently closed due to a defect in second sensor 202.

In the initialization phase of daisy chain connection 106, sensors 200, 202, 204, 206 are sequentially programmed, i.e., they have allocated to them a time slot in which, during operation, they send their data. A switch short circuit occurs because of the incorrectly closed switch in second sensor 202, and second sensor 202 and third sensor 204 are addressed simultaneously. The consequence is that addressing fails, and initialization of second sensor 202, and also of sensors 204, 206 downstream from the second sensor, is not possible.

In order to allow daisy chain circuit 106 nevertheless to go into operation with the functional first sensor 200, the fault detection described herein, and subsequent commissioning of PSI line 106 with only the functional first sensor 200, are executed.

A variety of possibilities exist for fault detection. One variant involves monitoring a quiescent current increase after second sensor 202 is switched on. If the above-described defect exists, the quiescent current increase is, according to an exemplifying embodiment, approximately twice what is expected.

A further variant involves monitoring an increase in a bus capacitance in series circuit 106 after second sensor 202 is switched on. If the above-described defect exists, then according to an exemplifying embodiment the increase in bus capacitance is approximately twice what is expected.

A third possibility that exists is to monitor a Manchester error after second sensor 202 is switched on. If the above-described defect exists, the Manchester error rate rises sharply.

If the above-described fault is detected during daisy chain initialization, then according to the present invention, upon a re-initialization of sensor series circuit 106, control device 104 furnishes a suppression signal 212 to first sensor 200 upstream from the defective second sensor 202. Suppression signal 212 can also be referred to as a "don't switch on" command 212. Suppression signal 212 prevents second sensor 202 from being switched on by first sensor 200, by the fact that first sensor 200 does not close its switch. The initialization phase ends at this point, and daisy chain connection 106 is commissioned with first sensor 200 connected in front of the defective second sensor 202, and the data of first sensor 200 can be used in control device 104.

Unlike what is shown in FIG. 2, daisy chain sensor circuit 106 can have more or fewer than the four sensors 200, 202, 204, 206 shown. Control device 104 can be configured (not applicable to daisy chain applications conforming to the PSI5 standard) to trigger a restraint device coupled to control device 104 using data of sensor series circuit 106. Alternatively, control device 104 can be part of a restraint device control device (not shown in FIG. 2) and can be configured to control the data communication of sensor series circuit 106.

Figure 3:
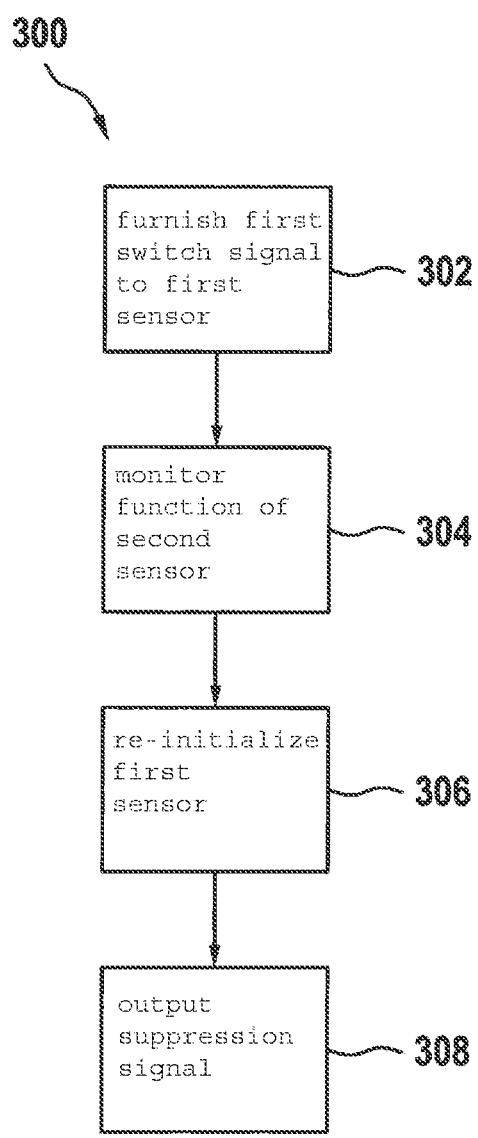
FIG. 3 is a flow chart of a method for commissioning a sensor series circuit configured in a daisy chain topology, according to an exemplifying embodiment.

FIG. 3 is a flow chart of an exemplifying embodiment of a method 300 for commissioning a sensor series circuit configured in a daisy chain topology. Method 300 can be executed in order to commission a variant of the sensor series circuit shown in FIGS. 1 and 2 having only the first sensor and the second sensor of devices of the control device electrically conductively connected to the sensor series circuit.

In an initialization phase for commissioning of the sensor series circuit, in a furnishing step 302 a first switch signal is furnished to the first sensor in response to a successful initialization of the first sensor, in order to close the first switch and start the initialization of the second sensor.

In a monitoring step 304, a function of the second sensor during its initialization is monitored. The result is to detect whether the second sensor exhibits a fault upon initialization, or instead is initialized correctly. In the event of detection of a fault upon initialization, in a sub-step of step 304 a fault signal is furnished to a device of the control device.

Initialization is discontinued in response to the fault signal and a re-initialization is started, in which the first sensor is re-initialized in a re-initialization step 306. If the initialization has failed n times, then during or after re-initialization of the first sensor in step 306, the suppression signal is outputted to the first sensor in an outputting step 308, causing the first sensor not to close its switch; initialization is terminated at this point.

The sensor series circuit can then be commissioned with the functionally capable first sensor.

Figure 4:
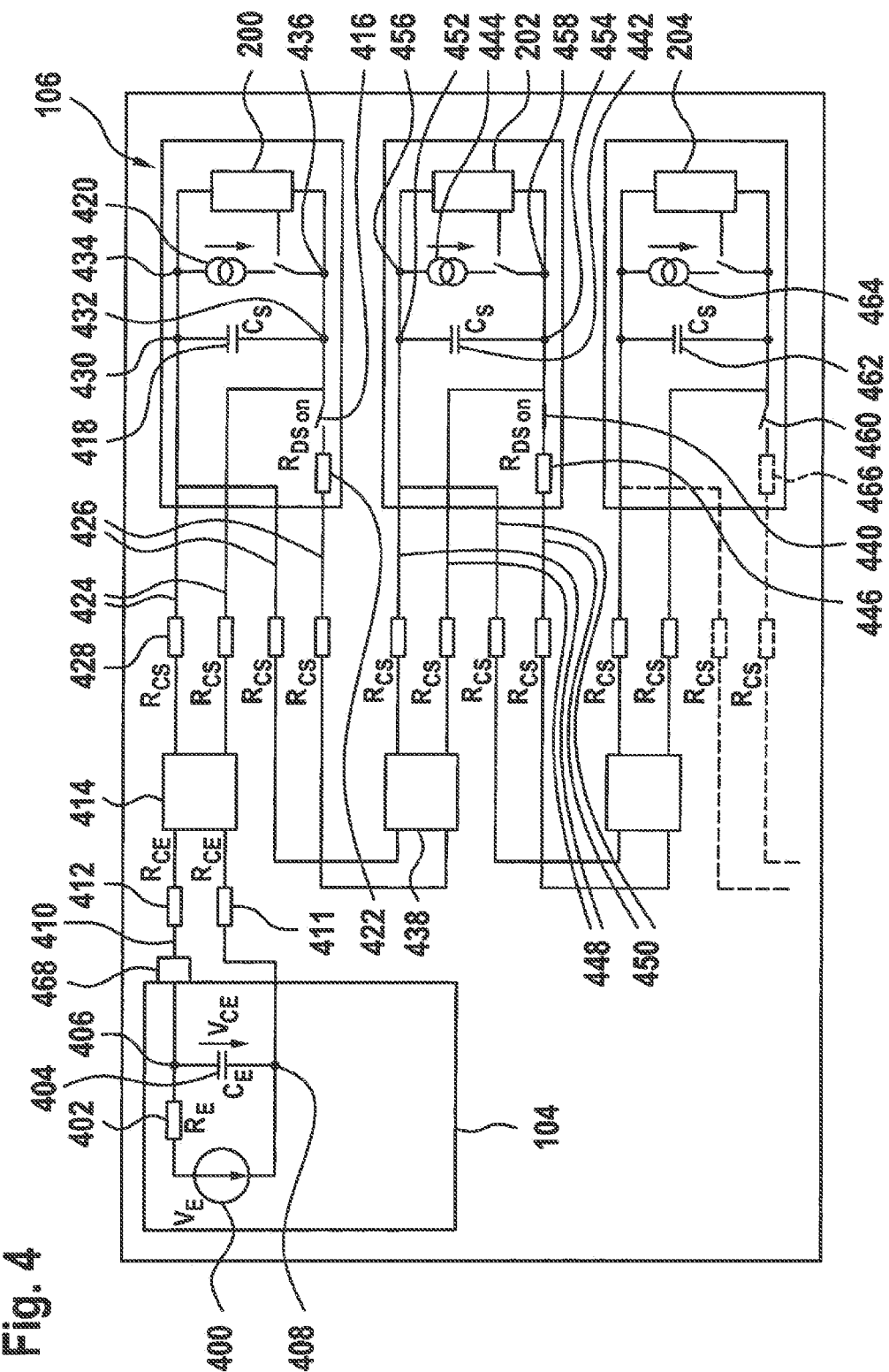
FIG. 4 is a block diagram of a sensor series circuit configured in a daisy chain topology, according to an exemplifying embodiment.

FIG. 4 is a block diagram of a sensor series circuit 106 configured in a daisy chain topology, in combination with an exemplifying control device 104 according to a further exemplifying embodiment. Sensor series circuit 106 shown in FIG. 4 is an exemplifying synchronous daisy chain bus in accordance with a PSI5 specification. An exemplifying first sensor 200, an exemplifying second sensor 202, and an exemplifying third sensor 204 of sensor series circuit 106 are shown.

A circuit of control device 104 or of ECU 104 encompasses a voltage source $V_E$ 400, a resistor $R_E$ 402, and a capacitor $C_E$ 404 that is connected between a first node 406 and a second node 408 in the circuit of ECU 104. A voltage $V_{CE}$ is present at capacitor $C_E$. A first electrical lead 410 of the circuit of control device 104 constitutes a current output of control device 104. A second electrical lead 411 of the circuit of control device 104 constitutes a current input of control device 104.

The two electrical leads 410, 411 are each equipped with a resistor $R_{CE}$ 412 (plug resistor) and terminate at a first terminal 414 for electrically conductive connection of ECU 104 to first sensor 200 of sensor series circuit 106.

A circuit of first sensor 200 encompasses a first switch 416, a first capacitor $C_S$ 418, a first current sink $I_{sink}$ 420 having a switch, and a first resistor $R_{DS\ on}$ 422. Two first electrical leads 424 of the circuit of first sensor 200 constitute a voltage input of first sensor 200 and terminate at first connecting line 414 for electrically conductive connection of ECU 104 to first sensor 200. Two further first electrical leads 426 of the circuit of first sensor 200 constitute a voltage output of first sensor 200. First electrical leads 424 constituting the first voltage input, and further first electrical leads 426 constituting the first voltage output, are each equipped with a resistor $R_{CS}$ 428 (sensor plug resistor). Further first electrical leads 426 of first sensor 200 terminate at a second connecting line 438 for electrically conductive connection of first sensor 200 to second sensor 202.

In the exemplifying embodiment of sensor series circuit 106 shown in FIG. 4, first capacitor $C_S$ 418 is connected between a first first node 430 and a first second node 432 of the circuit of first sensor 200. First current sink $I_{sink}$ 420 is connected between a first third node 434 and a first fourth node 436 of the circuit of first sensor 200. First switch 416 is connected between first second node 432 and first resistor $R_{DS\ on}$ 422.

A circuit of second sensor 202 encompasses a second switch 440, a second capacitor $C_S$ 442, a second current sink $I_{sink}$ 444 having a switch, and a second resistor $R_{DS}$ 446. Two second electrical on leads 448 of the circuit of second sensor 202 constitute a voltage input of second sensor 202 and terminate at connecting line 438 for electrically conductive connection of first sensor 200 to second sensor 202. Two further second electrical leads 450 of the circuit of second sensor 202 constitute a voltage output of second sensor 202. Second electrical leads 448 constituting the voltage input of second sensor 202, and further second electrical leads 450 constituting the voltage output of second sensor 202, are each equipped with a resistor $R_{CS}$ 428.

Analogously to first sensor 200, with second sensor 202 as well, second capacitor $C_S$ 442 is connected between a second first node 452 and a second second node 454 of the circuit of second sensor 202. Second current sink $I_{sink}$ 444 is connected between a second third node 456 and a second fourth node 458 of the circuit of second sensor 202. Second switch 440 is connected between second second node 454 and second resistor $R_{DS\ on}$ 446.

A circuit of third sensor 204 encompasses a third switch 460, a third capacitor $C_S$ 462, a third current sink $I_{sink}$ 464 having a switch, and a third resistor $R_{DS\ on}$ 466. The connections in the circuit of third sensor 204 are configured analogously to first sensor 200 and second sensor 202, and for reasons of clarity are not set forth in detail in FIG. 4.

According to exemplifying embodiments, sensor series circuit 106 also has further sensors that are downstream from third sensor 204.

As already discussed above, sensors 200, 202, 204 are initialized sequentially by allocation of a time slot. Firstly, first sensor 200 is addressed and initialized in a first time slot. After successful completion of the initialization of first sensor 200, first switch 416 of first sensor 200 is closed in order to provide it with electrical voltage for initialization of second sensor 202. Second sensor 202 is then addressed and initialized in a second time slot following the first time slot.

In the exemplifying embodiment of sensor series circuit 106 shown in FIG. 4, second switch 440 is permanently closed due to a defect in second sensor 202. An initialization of second sensor 202 and of third sensor 204 therefore fails.

A monitoring device 468, which in the exemplifying embodiment shown in FIG. 4 is provided at the voltage input of ECU 104 and is configured to monitor the initialization of sensors 200, 202, 204 and if applicable to detect a fault upon initialization, is provided for detection of the fault in second sensor 202. Monitoring device 468 here is a sensor 468 for monitoring a quiescent current intensity and/or a bus capacitance and/or a Manchester error rate in sensor series circuit 106.

According to an exemplifying embodiment, monitoring device 468 is configured to monitor a quiescent current intensity in sensor series circuit 106 and to ascertain the defect in second sensor 202 if, in response to the closure of first switch 416, the quiescent current intensity exceeds a predetermined quiescent current intensity threshold value or is twice as great as a reference magnitude of the quiescent current intensity.

According to a further exemplifying embodiment, monitoring device 468 is configured to monitor a bus capacitance in sensor series circuit 106 and to ascertain the defect in second sensor 202 if, in response to the closure of first switch 416, the bus capacitance exceeds a predetermined capacitance threshold value or is twice as great as a reference magnitude of the bus capacitance.

According to a further exemplifying embodiment, monitoring device 468 is configured to monitor a Manchester error rate in sensor series circuit 106 and to ascertain the defect in second sensor 202 if, in response to the closure of first switch 416, the Manchester error rate rises sharply, for example exceeds a predetermined Manchester error rate threshold value by more than 50%.

The exemplifying sensor series circuit 106 is shown in FIG. 4 in a switching state in which sensor series circuit 106 has been commissioned in accordance with the present invention. Because of the defective second sensor 202, upon re-initialization of first sensor 200 the suppression signal was furnished to first sensor 200, which in response to the suppression signal did not close first switch 416. Current delivery to second sensor 202 therefore was not established, and the initialization phase ended with successful initialization of first sensor 200. Sensor series circuit 106 was commissioned only with first sensor 200, whose data are processed in control device 104.

Figure 5:
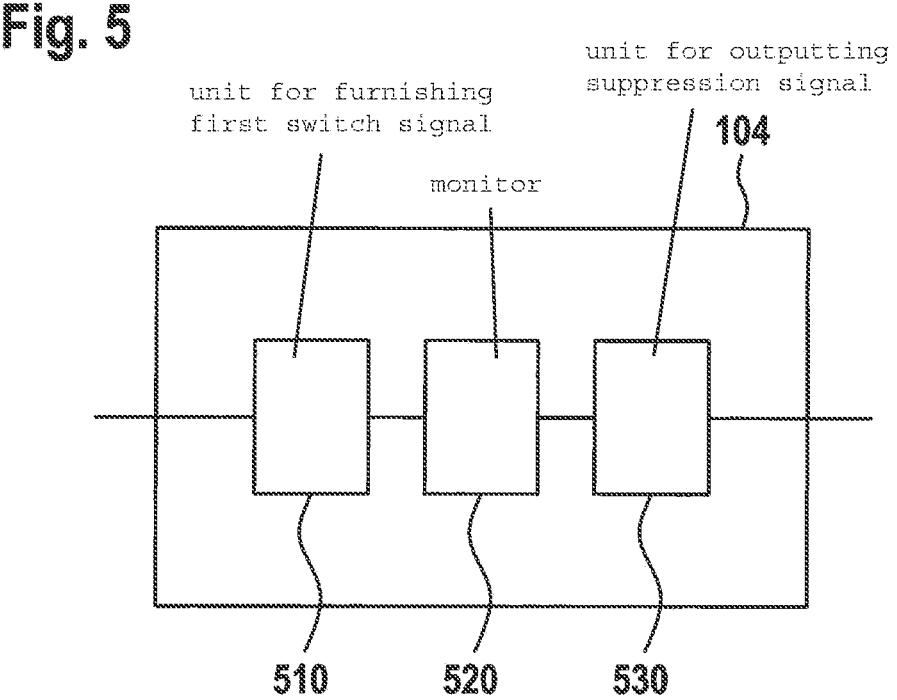
FIG. 5 is a block diagram depiction of a control device having corresponding devices for executing the steps of the method presented here.

It is noteworthy that control device 104 encompasses several units, as depicted in FIG. 5. Especially worthy of mention here is a unit 510 for furnishing a first switch signal to the first sensor in order to close the first switch, the first switch signal being furnished in response to a successful initialization of the first sensor. Control device 104 also has a unit 520 for monitoring a function of second sensor during initialization of the second sensor, in order to ascertain whether the second sensor exhibits a malfunction upon initialization or is initialized correctly, and in order to furnish a fault signal if it is ascertained that second sensor 202 exhibits a malfunction upon initialization. Lastly, control unit 104 has a unit 530 for outputting a suppression signal 212 to first sensor 200 if the fault signal has been furnished, in order to prevent first switch 416 from being closed.

If an exemplifying embodiment encompasses an "and/or" association between a first feature and a second feature, this is to be read to mean that according to one embodiment the exemplifying embodiment exhibits both the first feature and the second feature, and according to a further embodiment exhibits either only the first feature or only the second feature.

What is claimed is:

1. A method for commissioning a sensor series circuit configured in a daisy chain topology, the sensor series circuit having at least a first sensor having a first switch and a second sensor having a second switch, the second sensor being downstream from the first sensor in a direction of a current flow through the sensor series circuit, and a closure of the first switch producing a supply of an electrical voltage to the second sensor to initialize the second sensor, the method comprising:

furnishing a first switch signal to the first sensor to close the first switch, the first switch signal being furnished in response to a successful initialization of the first sensor;

monitoring a function of the second sensor during initialization of the second sensor to ascertain whether the second sensor exhibits a malfunction upon initialization or is initialized correctly;

ascertaining the second sensor exhibits a malfunction upon initialization based on the monitoring;

furnishing a fault signal based on ascertaining that the second sensor exhibits a malfunction upon initialization;

re-initializing the first sensor in response to the ascertaining that the second sensor exhibits a malfunction upon initialization; and outputting a suppression signal to the first sensor as a function of the furnishing of the fault signal to prevent the first switch from being closed.

2. The method as recited in claim 1, wherein the sensor series circuit has at least a third sensor having a third switch which is downstream from the second sensor in the direction of the current flow through the sensor series circuit, and the method further comprises:

closing the second switch to supply the third sensor with electrical voltage so as to initialize the third sensor.

3. The method as recited in claim 1, wherein, in the monitoring step, it is ascertained that the second sensor exhibits a malfunction upon initialization if a quiescent current intensity in at least a portion of the sensor series circuit exceeds, in response to the closure of the first switch, a predefined quiescent current intensity threshold value.

4. The method as recited in claim 3, wherein, in the monitoring step, it is ascertained that the second sensor exhibits a malfunction upon initialization if a quiescent current intensity in at least the portion of the sensor series circuit is, in response to the closure of the first switch, twice as great as a reference magnitude of the quiescent current intensity.

5. A method for commissioning a sensor series circuit configured in a daisy chain topology, the sensor series circuit having at least a first sensor having a first switch and a second sensor having a second switch, the second sensor being downstream from the first sensor in a direction of a current flow through the sensor series circuit, and a closure of the first switch producing a supply of an electrical voltage to the second sensor to initialize the second sensor, the method comprising:

furnishing a first switch signal to the first sensor to close the first switch, the first switch signal being furnished in response to a successful initialization of the first sensor;

monitoring a function of the second sensor during initialization of the second sensor to ascertain whether the second sensor exhibits a malfunction upon initialization or is initialized correctly;

ascertaining the second sensor exhibits a malfunction upon initialization based on the monitoring;

furnishing a fault signal based on the ascertaining that the second sensor exhibits a malfunction upon initialization; and outputting a suppression signal to the first sensor as a function of the furnishing of the fault signal, the suppression signal to prevent the first switch from being closed;

wherein, in the monitoring step, it is ascertained that the second sensor exhibits a malfunction upon initialization when a magnitude of a bus capacitance in at least a portion of the sensor series circuit exceeds, in response to the closure of the first switch, a predefined capacitance threshold value.

6. The method as recited in claim 5, wherein, in the monitoring step, it is ascertained that the second sensor exhibits a malfunction upon initialization if a magnitude of a bus capacitance in at least the portion of the sensor series circuit is, in response to the closure of the first switch, twice as great as a reference magnitude of the bus capacitance.

7. A method for commissioning a sensor series circuit configured in a daisy chain topology, the sensor series circuit having at least a first sensor having a first switch and a second sensor having a second switch, the second sensor being downstream from the first sensor in a direction of a current flow through the sensor series circuit, and a closure of the first switch producing a supply of an electrical voltage to the second sensor to initialize the second sensor, the method comprising:
- furnishing a first switch signal to the first sensor to close the first switch, the first switch signal being furnished in response to a successful initialization of the first sensor;
- monitoring a function of the second sensor during initialization of the second sensor to ascertain whether the second sensor exhibits a malfunction upon initialization or is initialized correctly;
- ascertaining the second sensor exhibits a malfunction upon initialization based on the monitoring;
- furnishing a fault signal based on the ascertaining that the second sensor exhibits a malfunction upon initialization; and
- outputting a suppression signal to the first sensor as a function of the furnishing of the fault signal, the suppression signal to prevent the first switch from being closed;
- wherein, in the monitoring step, it is ascertained that the second sensor exhibits a malfunction upon initialization when a rate of a Manchester error in at least a portion of the sensor series circuit exceeds, in response to the closure of the first switch, a predetermined Manchester error rate threshold value.

8. A method for commissioning a sensor series circuit configured in a daisy chain topology, the sensor series circuit having at least a first sensor having a first switch and a second sensor having a second switch, the second sensor being downstream from the first sensor in a direction of a current flow through the sensor series circuit, and a closure of the first switch producing a supply of an electrical voltage to the second sensor to initialize the second sensor, the method comprising:
- furnishing a first switch signal to the first sensor to close the first switch, the first switch signal being furnished in response to a successful initialization of the first sensor;
- monitoring a function of the second sensor during initialization of the second sensor to ascertain whether the second sensor exhibits a malfunction upon initialization or is initialized correctly;
- ascertaining the second sensor exhibits a malfunction upon initialization based on the monitoring;
- furnishing a fault signal based on the ascertaining that the second sensor exhibits a malfunction upon initialization; and
- outputting a suppression signal to the first sensor as a function of the fault signal, the suppression signal to prevent the first switch from being closed;
- re-initializing the first sensor in response to the ascertaining that the second sensor exhibits a malfunction upon initialization, the re-initializing being executed before the step of outputting the suppression signal to the first sensor.

9. A control device designed to commission a sensor series circuit configured in a daisy chain topology, the sensor series circuit having at least a first sensor having a first switch and a second sensor having a second switch, the second sensor being downstream from the first sensor in a direction of a current flow through the sensor series circuit, and a closure of the first switch producing a supply of an electrical voltage to the second sensor to initialize the second sensor, the control device designed to:
- furnish a first switch signal to the first sensor to close the first switch, the first switch signal being furnished in response to a successful initialization of the first sensor;
- monitor a function of the second sensor during initialization of the second sensor to ascertain whether the second sensor exhibits a malfunction upon initialization or is initialized correctly, and to furnish a fault signal if it is ascertained that the second sensor exhibits a malfunction upon initialization;
- re-initialize the first sensor in response to the ascertaining that the second sensor exhibits a malfunction upon initialization; and
- output a suppression signal to the first sensor if the fault signal has been furnished, to prevent the first switch from being closed.

10. A sensor series circuit configured in a daisy chain topology, the sensor series circuit comprising:
- at least a first sensor having a first switch and a second sensor having a second switch, the second sensor being downstream from the first sensor in a direction of a current flow through the sensor series circuit; and
- a control device designed to furnish a first switch signal to the first sensor to close the first switch, the first switch signal being furnished in response to a successful initialization of the first sensor, monitor a function of the second sensor during initialization of the second sensor to ascertain whether the second sensor exhibits a malfunction upon initialization or is initialized correctly, and to furnish a fault signal if it is ascertained that the second sensor exhibits a malfunction upon initialization, re-initialize the first sensor in response to ascertaining that the second sensor exhibits a malfunction upon initialization, and output a suppression signal to the first sensor if the fault signal has been furnished, to prevent the first switch from being closed, the control device being connected or connectable to the first sensor.

11. A restraint system, comprising:
a restraint device;
a sensor series circuit configured in a daisy chain topology, the sensor series circuit including at least a first sensor having a first switch and a second sensor having a second switch, the second sensor being downstream from the first sensor in a direction of a current flow through the sensor series circuit, and a control device control device designed to furnish a first switch signal to the first sensor to close the first switch, the first switch signal being furnished in response to a successful initialization of the first sensor, monitor a function of the second sensor during initialization of the second sensor to ascertain whether the second sensor exhibits a malfunction upon initialization or is initialized correctly, and to furnish a fault signal if it is ascertained that the second sensor exhibits a malfunction upon initialization, re-initialize the first sensor in response to ascertaining that the second sensor exhibits a malfunction upon initialization, and output a suppression signal to the first sensor if the fault signal has been furnished, to prevent the first switch from being closed, the control device being connected or connectable to the first sensor.

12. The restraint system as recited in claim 11, wherein the control device is configured to trigger the restraint device in response to a triggering signal.

13. A non-transitory machine-readable memory medium on which is stored a computer program for commissioning a sensor series circuit configured in a daisy chain topology, the sensor series circuit having at least a first sensor having a first switch and a second sensor having a second switch, the second sensor being downstream from the first sensor in a direction of a current flow through the sensor series circuit, and a closure of the first switch producing a supply of an electrical voltage to the second sensor to initialize the second sensor, the computer program, when executed by a processor, causing the processor to perform:

furnishing a first switch signal to the first sensor to close the first switch, the first switch signal being furnished in response to a successful initialization of the first sensor;

monitoring a function of the second sensor during initialization of the second sensor to ascertain whether the second sensor exhibits a malfunction upon initialization or is initialized correctly, and to furnish a fault signal if it is ascertained that the second sensor exhibits a malfunction upon initialization;

re-initializing the first sensor in response to ascertaining that the second sensor exhibits a malfunction upon initialization; and outputting a suppression signal to the first sensor if the fault signal has been furnished, to prevent the first switch from being closed.

\* \* \* \* \*